July 27, 1926.
L. K. ALDRIDGE
1,593,617
TEMPLE HINGE CONNECTION FOR SPECTACLES
Filed July 15, 1925
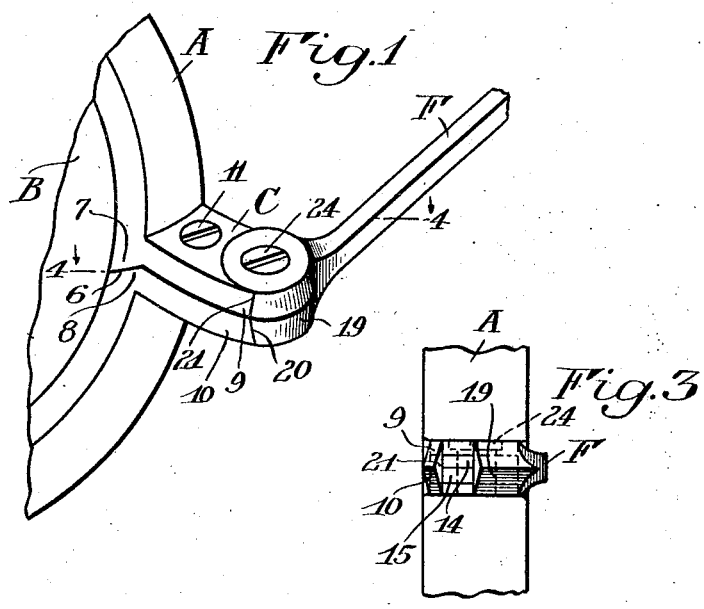
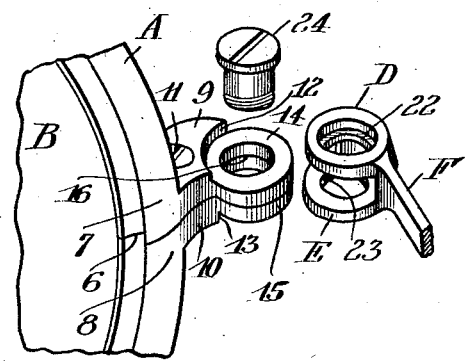
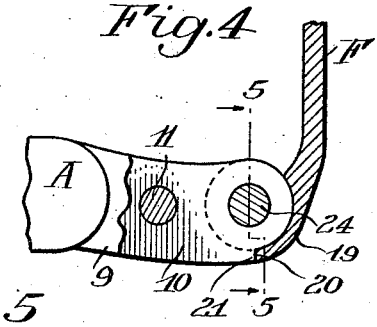
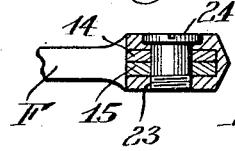
Inventor
Lewis K. Aldridge
By Frederick F. Church
his Attorney Patented July 27, 1926.

1,593,617

UNITED STATES PATENT OFFICE.

LEWIS K. ALDRIDGE, OF BATAVIA, NEW YORK.

TEMPLE-HINGE CONNECTION FOR SPECTACLES.

Application filed July 15, 1925. Serial No. 43,759.

The present invention relates to temple hinge connections for spectacles and has for its object to provide an improved temple hinge whereby the temple may be connected to or removed from the spectacle rims by the removal of a single securing element without removing the lens from the rim.

Another object of the invention is the provision of a temple hinge of a construction whereby the temple member has a long or wide line of contact with the hinge portion carried by the spectacle frame thereby affording a strong abutment for limiting the outward movement of the temple and a correspondingly strong bearing member on the temple to prevent rupture of the latter.

A still further object of the invention is the provision of a temple hinge wherein two leaves of the hinge are carried by the temple which are adapted to receive therebetween two ears carried by extensions on the rim together with an improved connecting portion between the leaves which makes for rigidity, neat appearance and a construction which is free from dirt collecting spaces.

A further object of the invention is the provision of a temple hinge which is of simple construction, economical to manufacture, pleasing in appearance and highly efficient in operation.

To these and other ends the invention resides in certain improvements and combinations of parts, all as will be hereinafter more fully described, the novel features being pointed out in the claims at the ends of the specification.

In the drawings:—

Figure 1 is a fragmentary view in elevation showing the temple in open or extended position;

Figure 2 is a perspective view of the hinge, the parts being shown in disassembled relation;

Figure 3 is an end elevation of the hinge with the temple in closed position;

Figure 4 is a horizontal section taken on line 4—4 of Figure 1, and

Figure 5 is a vertical section on line 5—5 of Figure 4.

Similar reference numerals throughout the several views indicate the same parts.

Describing the invention in general terms it will be seen that there is a spectacle rim A which carries a lens B. The spectacle rim is provided with an outwardly extending hinge portion or leaf indicated generally at C which is adapted for insertion between the leaves D and E of the temple F.

Describing the invention in detail it will be seen that the spectacle rims A are split at 6, the ends 7 and 8 of the rims being provided with extensions 9 and 10 which are in parallel relation and disposed at right angles to the rim. These extensions are fastened together by means of a screw 11 or the equivalent thereof and this screw, in addition to clamping the extensions together to form the hinge leaf C, clamps the split spectacle rim A about the lens B, holding it firmly in place. The extensions 9 and 10 are provided adjacent their outer ends with semi-circular shoulders 12 and 13 which terminate at the front edges of the extensions in angularly disposed abutments 21, while the ends of the extensions terminate in the superimposed circular ears 14 and 15 provided with a bearing surface at 16 to receive the temple pivot screw 24.

The hinged leaves D and E are in spaced parallel relation and are circular in form as indicated in Figure 2, and of a size similar to the circular ears 14 and 15 of the hinge leaf C. Joining the two temple hinge leaves D and E throughout a considerable portion of their perimeter is a semi-circular wall 19, the outer end 20 of which is adapted when the temple is in open position to engage the abutments 21 of the extensions 9 and 10 over their entire surfaces. This connecting wall on its inner face, is preferably adapted to frictionally engage the edges or peripheral portions of the ears 14 and 15 to increase the frictional resistance to the movement of the temple upon the ears whereby the temple is more firmly held in extended or adjusted position. The circular wall 19 serves to firmly tie the leaves D and E together, thus strengthening the temple at this point, said wall forming, with the front faces of the extensions 9 and 10, a continuous curved surface affording an extremely neat and pleasing hinge joint which is of a strong and durable nature.

The temple hinge leaf D is provided with a counter-bore 22 to receive the head of the pivot screw 24, the screw being threaded into the leaf E and serving to clamp or bind the leaves upon the ears 14 and 15 whereby to afford increased frictional resistance between said parts.

With a hinge constructed as described it will be seen that there are two screws used, one of which holds the rim in closed position upon the lens while the other permits the temple to be readily and easily removed without destroying the exact adjustment of the lens in relation to the rim. The present temple hinge is of a very strong construction and is not easily wabbled, by reason of the curved wall 19 being in close engagement with the peripheral surfaces of the leaves D and E as well as by reason of the long bearing 20 at the outer end of said wall in contact with a bearing of equal length afforded by the abutments 21 of the extensions 9 and 10.

Attention is also directed to the fact that by reason of the relatively long line of contact between the end portion 20 of the wall 19 and the abutments 21 of the extensions 9 and 10 that said parts are increased in cross-sectional area over the usual type of construction and are therefore capable of resisting greater strains, consequently prolonging the life of the hinge.

By reducing the ears 14 and 15 to the thickness shown the leaves D and E are brought flush with the extensions 9 and 10 thereby affording a hinge which is flush both at its top and bottom.

From the foregoing it will be understood that with a construction such as described a hinge is provided in which the chances of breakage are reduced to a minimum and in which the increased bearing surfaces provided between the temple and frame extensions reduces the tendency of the temple to work loose or wabble, the construction having the additional advantage of permitting the temple to be quickly attached to or removed from the lens rim without the necessity of opening the rim.

I claim as my invention:

1. A spectacle mounting comprising a split lens frame having temple receiving extensions rigidly clamped together, said extensions being reduced in thickness to form circular shaped ears having semi-circular shoulders at their edges nearest the frame which terminate at the front edges of the extensions in angularly disposed abutments corresponding in length to the thickness of the extensions; a temple having a pair of spaced circular shaped hinge leaves adapted to receive therebetween the circular shaped ears, the outer faces of said leaves being substantially flush with the corresponding faces of said extensions, a screw headed within one of said leaves and projecting through said ears and threaded into the other of the leaves to form a pivotal connection for the temple, and a circular shaped connecting wall between said leaves projecting substantially to the front of the extensions to engage said abutments over their entire area when the temple is in extreme open position.

2. A spectacle mounting comprising a split lens frame having temple receiving extensions rigidly clamped together, said extensions being reduced in thickness at their outer extremities to form circular shaped ears having semi-circular shoulders at their edges nearest the frame which terminate at the front edges of the extensions in angularly disposed abutments corresponding in length to the thickness of the extensions, a temple having a pair of spaced circular shaped hinge leaves adapted to receive therebetween the circular ears, the outer faces of said leaves being substantially flush with the corresponding faces of said extensions, a screw projecting through said ears into threaded engagement with one of said leaves and having its head disposed within a shouldered recess of the opposite leaf and adapted to clamp said leaves upon said ears, and a circular shaped connecting wall between said leaves extending forwardly to engage said abutments over their entire area when the temple is in extreme open position, the inner face of said wall being adapted to frictionally engage the edges of said ears to assist in holding the temple in open position.

LEWIS K. ALDRIDGE.